United States Patent Office 3,255,186
Patented June 7, 1966

3,255,186
3-(PYRIDYL)-2H-1,4-BENZOXAZIN-2-ONES
Robert Bruce Moffett, Kalamazoo, Mich., assignor to The Upjohn Company, Kalamazoo, Mich., a corporation of Delaware
No Drawing. Filed Nov. 4, 1963, Ser. No. 321,298
2 Claims. (Cl. 260—244)

This invention relates to new chemical compounds, intermediates for the preparation thereof, and a process of preparation and is particularly directed to novel 3-(pyridyl)-2H-1,4-benzoxazin-2-ones and lower-alkyl pyridineglyoxylate hydrates.

The novel compounds of the invention have the following structural formula

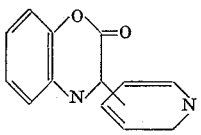

Formula I

The novel intermediates for the preparation of a compound of the Formula I have the following structural formula

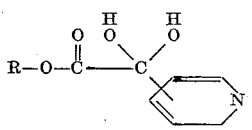

Formula II wherein R is lower-alkyl of from 1 to 4 carbon atoms, inclusive, e.g., methyl, ethyl, propyl, butyl, and the isomeric forms thereof.

The compounds of the Formula I are prepared by condensing o-aminophenol with a compound of the Formula II.

Compounds of the Formula II are prepared by the oxidation of an alkyl pyridineacetate with selenium dioxide to form the corresponding alkyl pyridineglyoxylate and formation of the hydrate with water.

The condensation of o-aminophenol with a compound of the Formula II to obtain a compound of the Formula I is accelerated by gentle heating (from room temperature, about 25° C., to about 180° C., the optimum temperature depending upon the nature of the R moiety) and can if desired be carried out in a non-oxidizing atmosphere, for example, nitrogen. The proportions of reactants can be varied over a wide range. Equimolar amounts are preferred though an excess of either reactant can be used if so desired. Advantageously, an inert solvent, for example, toluene, methanol, ethanol, dioxane, tetrahydrofuran, and ethyl acetate is used.

The compounds of the Formula I are active enzyme inhibitors. For example, the enzyme systems o-methyl transferase and 5-hydroxytryptophan decarboxylase can be inhibited by introduction of the said compounds into the environments of the said enzyme systems. The compounds of the Formula I are also useful as antifungal agents and can be used to inhibit the growth of, for example, T. rubrum and S. fructicola. Further, the compounds are useful as antibacterial agents for inhibiting the growth of, for example, A. aerogenes, P. vulgaris, and P. morganii.

The compounds of the Formula II are useful as intermediates for preparing the compounds of Formula I and also have diuretic activity and can be used to produce diuresis in mammals or animals, e.g., rats and mice by oral and parenteral administration.

The invention can be more fully understood by reference to the following examples which are given by way of illustration and not of limitation. Parts and percentages are by weight unless otherwise specified.

EXAMPLE 1

Methyl 4-pyridineglyoxylate hydrate

A mixture of 10.15 gm. (0.067 mole) of methyl 4-pyridine-acetate, 10 ml. of acetic acid, 30 ml. of benzene, and 7.44 gm. (0.067 mole) of selenium dioxide was stirred under reflux using a Dean-Stark trap to remove water. Approximately the theoretical amount of water was condensed in about ½ hour. The solvent was then removed in vacuo below 50° C. and the residue was distilled in a short-path apparatus, cooled by an acetone-solid carbon dioxide bath. The residue distilled below 150° C./3 mm. to provide 5.1 gm. of methyl 4-pyridineglyoxylate as a light yellow solid mixed with a little acetic acid. This product was recrystallized from water from which methyl 4-pyridineglyoxylate hydrate crystallized as light pink crystals having a melting point of 114–118° C. in an amount of 2.33 gm. (19.0% theory). The structure of the hydrate was confirmed by IR, UV, NMR, and elemental analysis.

Analysis.—Calcd. for $C_8H_9NO_4$: C, 52.46; H, 4.95; N, 7.65; O, 34.94; $H_2O$, 9.84. Found: C, 52.50; H, 4.79; N, 7.92; O, 34.70; $H_2O$, 9.86.

EXAMPLE 2

Following the procedure of Example 1, substituting for the methyl 4-pyridineacetate of the example, an equimolar amount each of Methyl 2-pyridineacetate,
Methyl 3-pyridineacetate,
Ethyl 2-pyridineacetate,
Ethyl 3-pyridineacetate,
Ethyl 4-pyridineacetate,
Propyl 2-pyridineacetate,
Isopropyl 4-pyridineacetate,
Butyl 4-pyridineacetate, and
Isobutyl 3-pyridineacetate, There can be obtained Methyl 2-pyridineglyoxylate hydrate,
Methyl 3-pyridineglyoxylate hydrate,
Ethyl 2-pyridineglyoxylate hydrate,
Ethyl 3-pyridineglyoxylate hydrate,
Ethyl 4-pyridineglyoxylate hydrate,
Propyl 2-pyridineglyoxylate hydrate,
Isopropyl 4-pyridineglyoxylate hydrate,
Butyl 4-pyridineglyoxylate hydrate, and
Isobutyl 3-pyridineglyoxylate hydrate, respectively.

EXAMPLE 3

3-(4-pyridyl)-2H-1,4-benzoxazin-2-one

To a warm solution of 4.66 gm. (0.0254 mole) of methyl 4-pyridineglyoxylate hydrate in 50 ml. of methanol was added 2.79 gm. (0.0254 mole) of o-aminophenol. After heating at 35–50° C. for 5 hours the solution was evaporated to dryness in vacuo below 50° C., leaving a residual oil. Infrared indicated incomplete reaction so the residual oil was heated on a steam bath for 20 minutes, whereupon methanol was evolved and the mixture set solid. The solid was recrystallized from absolute ethanol and collected on a filter to provide 2.52 gm. of crude 3-(4-pyridyl)-2H-1,4-benzoxazin-2-one (A). The filtrate was concentrated and provided 1.7 gm. of a mixture containing 3-(4-pyridyl)-2H-1,4-benzoxazin-2-one. The mixture was shaken with 35 ml. of 2% aqueous sodium hydroxide and the 3-(4-pyridyl)-2H-1,4-benzoxazin-2-one (B) was collected on a filter, washed with water and dried. The preceding products (A) and (B) were combined and sublimed at temperatures up to 162° C. (bath)/0.002 mm. to provide 2.6 gm. of solid which was recrystallized from ethanol (with decolorizing charcoal treatment) to provide 2.13 gm. (37.5% theory) of silky needles of 3-(4-pyridyl)-2H-1,4-benzoxazin-2-one having a melting point of 168–169° C. IR, UV, and NMR confirmed the structure.

*Analysis.*—Calcd. for $C_{13}H_8N_2O_2$: C, 69.64; H, 3.59; N, 12.50; O, 14.27. Found: C, 69.72; H, 3.49; N, 12.82; O, 15.23.

EXAMPLE 4

Following the procedure of Example 3, substituting for the methyl 4-pyridineglyoxylate hydrate of the example, an equimolar amount each of methyl 2-pyridineglyoxylate hydrate and methyl 3-pyridineglyoxylate hydrate, there can be obtained 3-(2-pyridyl)-2H-1,4-benzoxazin-2-one and 3-(3-pyridyl)-2H-1,4-benzoxazin-2-one, respectively.

What is claimed is:
1. A compound of the formula

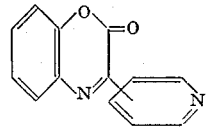

2. 3-(4-pyridyl)-2H-1,4-benzoxazine-2-one.

References Cited by the Examiner

FOREIGN PATENTS 815,279   6/1959   Great Britain.
879,247  10/1961   Great Britain.

OTHER REFERENCES

Noller, "Chemistry of Organic Compounds," 2nd Ed., p. 812 (Saunders) (1957).

WALTER A. MODANCE, *Primary Examiner.*
ROBERT T. BOND, *Assistant Examiner.*